United States Patent [19]

Romano

[11] Patent Number: 4,876,913
[45] Date of Patent: Oct. 31, 1989

[54] GEAR SELECTOR FOR BICYCLE SPEED GEARS

[75] Inventor: Antonio Romano, Padua, Italy

[73] Assignee: Campagnolo S.p.A., Vicenza, Italy

[21] Appl. No.: 87,389

[22] Filed: Aug. 20, 1987

[30] Foreign Application Priority Data

Sep. 9, 1986 [IT] Italy .............................. 21647 A/86
Feb. 11, 1987 [IT] Italy .............................. 19346 A/87

[51] Int. Cl.$^4$ .............................................. G05G 5/06
[52] U.S. Cl. ........................................ 74/535; 74/475;
74/489; 74/502.2; 74/527; 74/531
[58] Field of Search ................ 74/488, 529, 489, 536,
74/475, 502.2, 523, 527, 531, 535; 474/80, 82, 81; 280/236

[56] References Cited

U.S. PATENT DOCUMENTS

| | | | |
|---|---|---|---|
| 3,481,217 | 12/1969 | Maeda | 74/489 |
| 3,602,245 | 8/1971 | Meisel | 74/527 X |
| 3,972,247 | 8/1976 | Armstrong | 74/489 |
| 4,155,270 | 5/1979 | Juy | 74/489 |
| 4,189,954 | 2/1980 | Nakamura et al. | 74/475 X |
| 4,232,564 | 11/1980 | Yamasaki | 74/475 |
| 4,270,481 | 6/1981 | Watarai | 74/489 X |
| 4,343,201 | 8/1982 | Shimano | 74/489 X |
| 4,454,784 | 6/1984 | Shimano | 74/475 |
| 4,504,250 | 3/1985 | Juy | 74/475 X |
| 4,548,092 | 10/1985 | Strong, Jr. | 74/489 X |
| 4,676,118 | 6/1987 | Leiter | 74/527 X |
| 4,699,018 | 10/1987 | Tagawa | 74/527 |
| 4,751,850 | 6/1988 | Nagano | 74/488 |
| 4,768,395 | 9/1988 | Tagawa | 74/489 |

Primary Examiner—Rodney M. Lindsey
Attorney, Agent, or Firm—Young & Thompson

[57] ABSTRACT

In a gear selector for controlling speed gears with a spring-loaded derailleur for sports and racing bicycles, there are associated with the gear selector operating lever (1), mounted rotatable against friction on a pivot (2), a snap-action mechanism controlling a plurality of lever positions with which a like number of positions of correct alignment of the speed gear with the various sprockets of the free wheel correspond, and means for activating and deactivating said mechanism on command. This snap-action mechanism comprises a notched member (4) with notches (18) in different positions, which is immediately interchangeable so as to adapt the gear selector to the control of any type of free wheel and of the most varied combinations of sprockets in free wheels, and at least one pawl for engaging the notches of said member and constructed integrally (5) with the spring which urges it into said engagement.

4 Claims, 13 Drawing Sheets

GEAR SELECTOR FOR BICYCLE SPEED GEARS

BACKGROUND OF THE INVENTION

In bicycles provided with a speed gear having a spring-loaded derailleur, in particular in sports and racing bicycles, the drive chain is caused to pass from one sprocket to another of the free wheel by the lever of a gear selector operated by the cyclist, and which by means of a cable shifts the gear derailleur so as to align it with that sprocket of the free wheel corresponding to the desired ratio.

This operation is carried out by feel, as it is not possible for the cyclist to observe what happens behind him.

On numerous occasions, and in particular during cycle races, the proper execution of a gear change can be compromised by the state of mind of the competitor, the gear change either being made onto sprockets other than those intended, or requiring a lengthy time which is completely unacceptable.

In order to make the aforesaid operation easy and reliable to execute by the cyclist within reasonable time, speed gear selectors have already been provided in which the lever operable by the cyclist and mounted rotatable against friction on a pivot is associated with a snap-action mechanism controlling a plurality of different positions of the lever, with which a like number of positions of correct alignment of the speed gear with the various sprockets of the free wheel correspond.

Means for activating and deactivating said snap-action mechanism on command have also been associated with the gear selector operating lever and with the snap-action mechanism itself. This leaves the cyclist free at every moment to choose between operation by feel and operation by preselecting the speed gear ratios.

In these gear selectors there are generally provided a main friction device which opposes the return spring of the speed gear and a secondary friction device which opposes the operation of the means for activating and deactivating the snap-action mechanism.

The methods of the known art used for obviating the aforesaid problems have up to the present time comprised a very complicated mechanism requiring a large number of component parts, the assembly and disassembly of which are neither easy nor immediate. Moreover, these known methods do not allow ready adaptation to the various types of free wheels existing on the market, nor to the different and numerous combinations of sprockets which can be used in them by cyclists during races. It therefore happens that even today replacing one free wheel by another (for example replacing a wide free wheel comprising six sprockets by a narrow free wheel comprising seven or eight sprockets, this being a frequent operation in sporting activity and often done during an actual race or races which take place overy very short times) requires work to be carried out which not only involves the gear selector but is also too long and complicated, and therefore in practice impossible to do during a race and/or within a short time. This has up to the present time hindered the application and marketing of improved gear selectors of the aforesaid type, or has limited their use by cyclists, with obvious disadvantages.

The object of the present invention is therefore to decisively improve the characteristics of these devices, this object being attained by a gear selector of extremely simple, compact and effective structure, which with optimum operation efficiency allows virtually immediate adaptation to any type of free wheel and to any number and combination of sprockets in free wheels produced by any manufacturer. The bicycle gear change can therefore be easily implemented by the cyclist, either by choosing preselection operated by snap-action, or by choosing the method based on feel and excluding this preselection.

SUMMARY OF THE INVENTION

The gear selector according to the invention, of the general type described heretofore, is characterised substantially in that the snap-action mechanism associated with the operating lever for controlling its positions comprises a notched member which is immediately interchangeable so as to adapt the gear selector to the control of the most varied combinations and numbers of sprockets in free wheels, and at least one pawl for engaging the notches of said member and constructed integrally with the spring which urges it into said engagement.

The notched member can advantageously be a ring mounted coaxial to the gear selector lever and locked or lockable against rotation, it comprising on its outer periphery a plurality of notches in different positions, the number and distance apart of which are a function of the number of sprockets and the type of the free wheel mounted on the bicycle.

The gear selector spring is preferably a flat spring, a tooth of which forms said pawl, and can be constructed as a pack of springs.

To enable the cyclist, during the use of the bicycle on which the gear selector according to the invention is mounted, to adjust both the main friction device on which the force opposing the speed gear return spring depends, and the secondary friction device which opposes the operation of the means for activating and deactivating the lever snap-action mechanism, said first friction device comprises a pair of cup springs associated with the gear selector operating lever and locked axially by a stop cylinder and by a setscrew, and a forked-ring presser associated with said setscrew and having its ring pressing against the first of said cup springs, and the branches of its fork, which are slidable in opposing grooves of the shank and head of said setscrew, engaged at their free end by an operating member arranged to produce axial movements of said presser, and said second friction device comprises a cup spring which is mounted on the bevelled, threaded head of said setscrew to remain rotationally locked, and is pressed against the control member of the means for activating and deactivating the snap-action mechanism by a knurled-edge washer which is screwed by its threaded bore onto the threaded head of said setscrew.

BRIEF DESCRIPTION OF THE DRAWINGS

The invention is described in greater detail hereinafter by way of example with reference to various embodiments thereof, illustrated on the accompanying drawings in which:

FIG. 16 shows a modification of the gear selector of FIG. 12, of which

DESCRIPTION OF THE PREFERRED EMBODIMENTS

With reference to FIGS. 1 to 6, the gear selector according to the invention comprises an operating lever 1 mounted freely rotatable on a pivot 2, but subjected in known manner, in opposition to the return spring of the gear change derailleur, to the friction force of two adjustable friction devices. The control cable (not shown) for the derailleur is applied to the operating lever 1.

Figure 1:
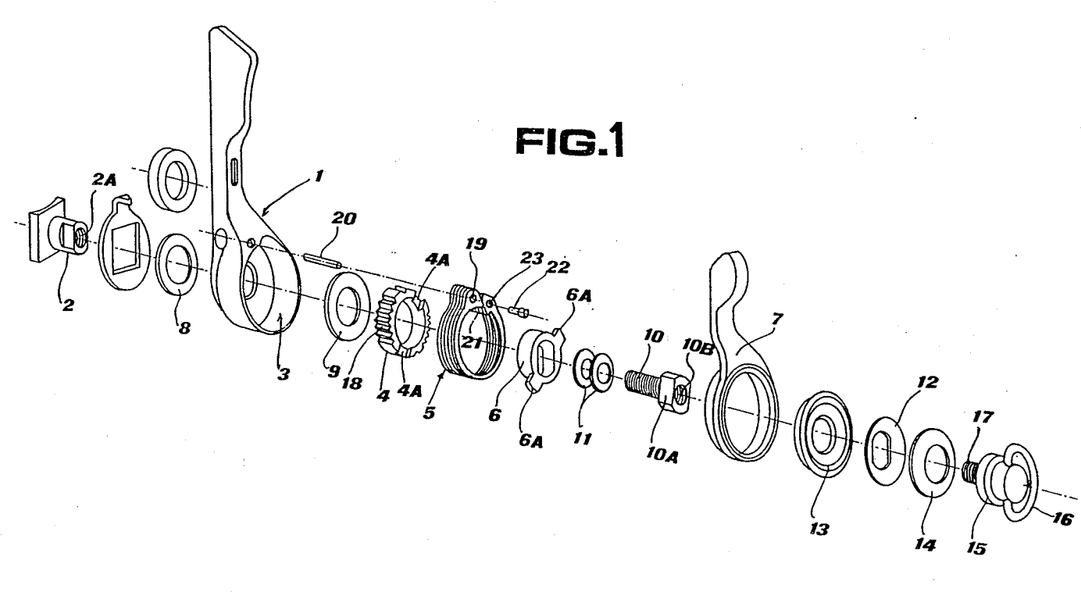
FIG. 1 is a perspective view of a first embodiment of the gear selector according to the invention with its parts demounted.
Figure 2:
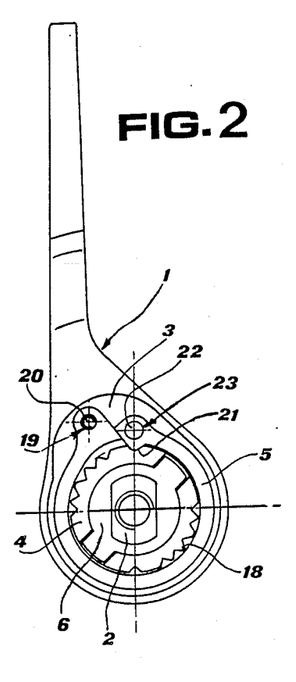
FIG. 2 is a partly sectional side view of the gear selector of FIG. 1, with the snap-action control mechanism active.
Figure 3:
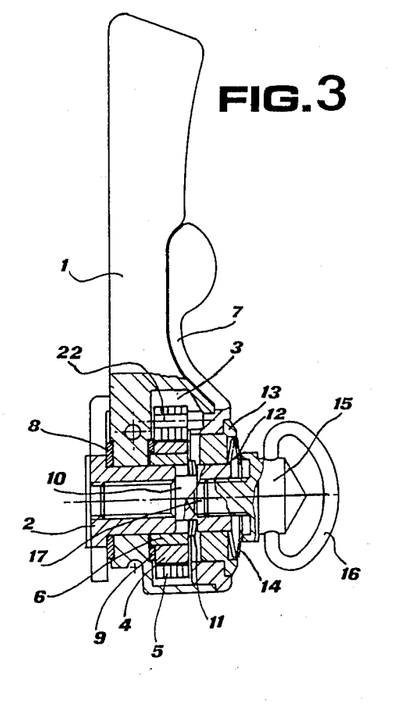
FIG. 3 is an axial section through the gear selector of FIGS. 1 and 2.
Figure 4:
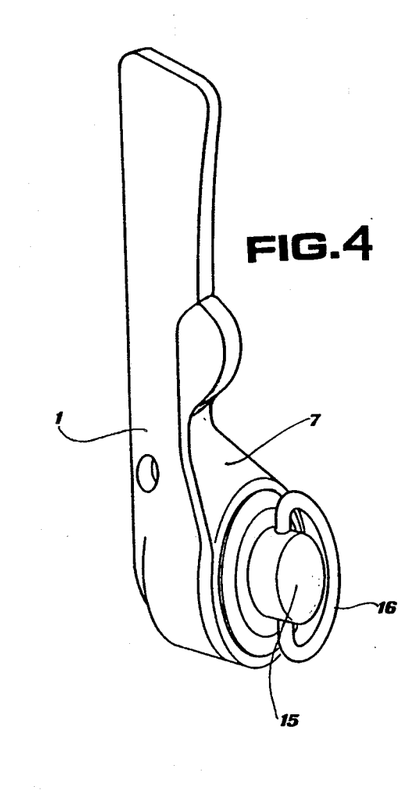
FIGS. 4 and 5 are two perspective views of the gear selector according to the invention in two different operating conditions.
Figure 5:
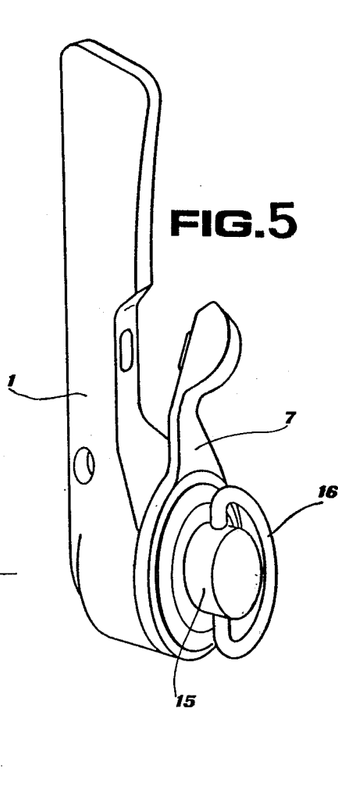

According to the invention, a notched ring 4, a pawl-spring assembly 5 and a stop cylinder 6 forming the snap-action control mechanism for the gear selector are disposed in the cavity 3 of the lever 1. In addition an arm 7 for activating and deactivating the snap-action mechanism is associated with the lever 1.

The first of the gear selector friction devices consists of washers 8 and 9 mounted one external to the lever 1 and the other within the cavity 3 thereof, and an adjustment screw 10 which is screwed into the threaded seat 2A of the pivot 2. By way of a pair of cup springs 11, the stop cylinder 6 and the notched ring 4, the screw 10 exerts on the washers 8 and 9, and consequently on the lever 1, a pressure the intensity of which depends on how far it is screwed into the seat 2A. A variable resistance force is therefore created, the value of which is fixed during the assembly of the mechanism, the screw 10 not being adjustable by the cyclist.

The second of the gear selector friction devices consists of a washer 12 which is fitted onto the bevelled head 10A of the screw 10 in a non-rotatable manner and acting by way of a presser member 13 on the arm 7 to press it against the lever 1. The washer 12 is pressed by a freely rotatable washer 14 on which there acts a bush 15 with an operating ring 16 and screw 17. The screw 17 of the bush 15 is screwed into the threaded seat 10B of the screw 10.

The snap-action control mechanism is mounted as stated within the cavity 3 of the lever 1. The stop cylinder 6 thereof is fixed onto the pivot 2 so that it can move axially with respect thereto but is prevented from rotating. The notched ring 4—which on its periphery comprises a plurality of differently spaced notches 18, their number and distance apart being chosen according to the number of sprockets and the characteristics of the free wheel mounted on the bicycle—is mounted over the stop cylinder 6 with which it rotates rigidly by the engagement of appendices 6A of the cylinder with recesses 4A in the ring. The assembly 5 is formed from a number of open-eye flat springs stacked together, which enclose the ring 4 and are fixed at one end at 19 to the lever 1 by a pin 20, and are free at their other end. At this second end there is provided on each spring a tooth 21 to form the pawl for engaging the notches of the ring 4.

Figure 6:
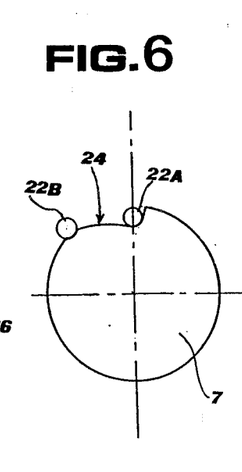
FIG. 6 shows a detail of the same device.
Figure 7:
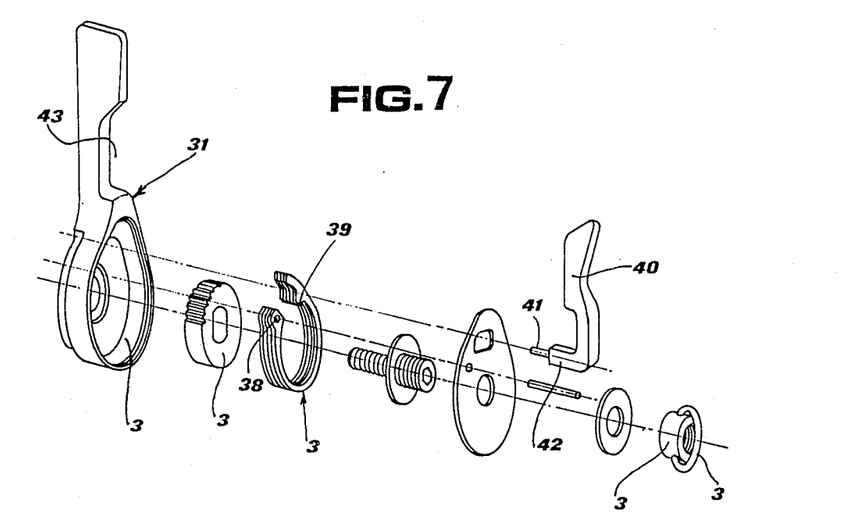
FIG. 7 is a view of a second embodiment of the gear selector according to the invention with parts demounted.

The snap-action mechanism activation and deactivation means consist of the arm 7 and a pin 22, the shank of which is pivoted at 23 to the free end of the flat springs of the assembly 5, and the head of which enters a helical relief 24 provided on the rear of the arm 7 (as is clearly shown in FIG. 6, which represents a partial rear view of said arm).

When arm 7 is parallel to the lever 1 (FIGS. 3 and 4), the helical relief 24 keeps the head of the pin 22 in the position 22A (FIG. 6) in proximity to the axis of the pivot 2, so that the teeth 21 of the flat springs of the assembly 5 can engage in the notches of the ring 4 in the manner of a snap-action pawl (FIG. 2).

The snap-action mechanism is thus active, and the movements of the lever 1 not only overcome the resistance of the friction system but also result in elastic deformation of the pack of springs 5 and the snapping of the pawl 21 into the notches of the ring 4, in accordance with the ratio required by the cyclist and easily determined by him.

If the snap-action mechanism is to be deactivated in order to obtain only conventional friction operation of the gear selector (the cyclist then choosing these ratios by feel alone), it is necessary only to rotate the arm 7 clockwise so that the helical guide 24 radially withdraws the pin 22 from its preceding position 22A, and moves it into the position 22B of FIG. 6. In this manner the pin 22, by bending the springs of the assembly 5 causes their teeth 21 to withdraw from the ring 4, so preventing their engagement with the notches thereof and consequently obtaining simple and effective passage of the gear selector from snap-action control operation to conventional friction operation.

When the snap-action mechanism is engaged, the friction between the lever 1 and arm 7 prevents disengagement of the mechanism. In contrast, if this mechanism has been intentionally disengaged, the cyclist is able to vary the friction force opposing the return spring of the speed gear by rotating the bush 15 which engages the washers 12 and 14, so varying the pressure of the lever 1 against the washer 8.

It will be noted that the device is constructed of few components, which are extreme constructional simplicity and are very easy to assemble. This is due in particular to the fact of having formed the pawl-spring assembly as a single piece (or as an assembly 5 of stacked pieces, as shown).

Because of this simplicity of construction and assembly, it is possible in a very short time to adapt the gear selector to any combination of speed gear and free wheel devices. In this respect, it is necessary only to replace the notched ring 4 by a suitable one having its number of notches and the distance between them corresponding to the number of sprockets and type of the bicycle free wheel. As simple observation of FIGS. 1 to 3 immediately confirms, the operation can be carried out with maximum ease in just a few moments.

FIGS. 7 to 11 illustrate a further possible embodiment of the invention. The lever 31, rotatable on the pivot 32 (FIG. 11), is subjected to friction force by a friction device, which can be adjusted by tightening a wing screw 33 having an operating ring 34. Within a cavity 35 of the lever 31 there are positioned a notched ring 36, fixed on the pivot 32 (FIG. 10) and therefore locked against rotation, and a spring-pawl assembly 37 which is similar to that having the reference numeral 5 in the preceding embodiment and is pivoted at 38 to the lever 31, it being formed from a pack of open-eye springs with teeth 39 which form the pawl.

The ring 36 and assembly 37 constitute the snap-action mechanism, the activation and deactivation means of which are represented by an arm 40 cooperating with the lever 31 on which it is pivoted by means of its end 41, which is bent at a right angle and carries a cam 42. The cam 42 is arranged to engage the free end of the springs of the assembly 37 close to the teeth 39.

Figures 8, 9:
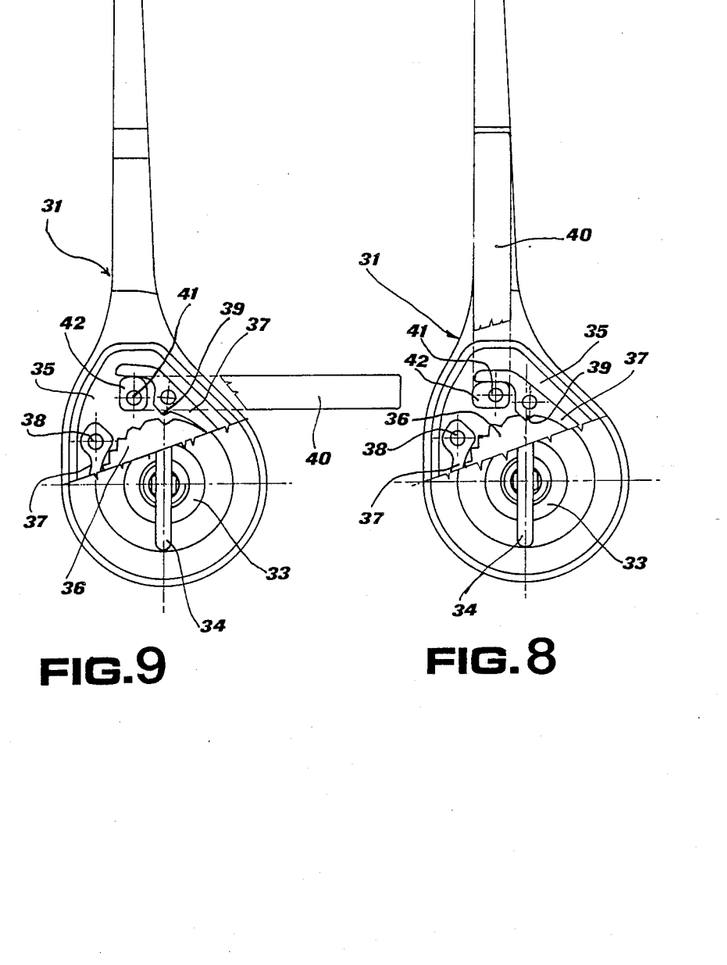
FIGS. 8 and 9 are two partly sectional side views of the gear selector of FIG. 7 with the snap-action control mechanism activated and deactivated respectively.
Figure 10:
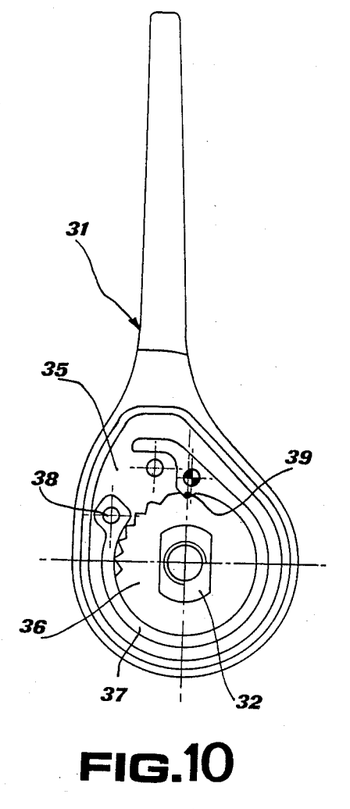
FIGS. 10 and 11 are a further side view and axial section of the gear selector of FIGS. 7 to 9.
Figure 11:
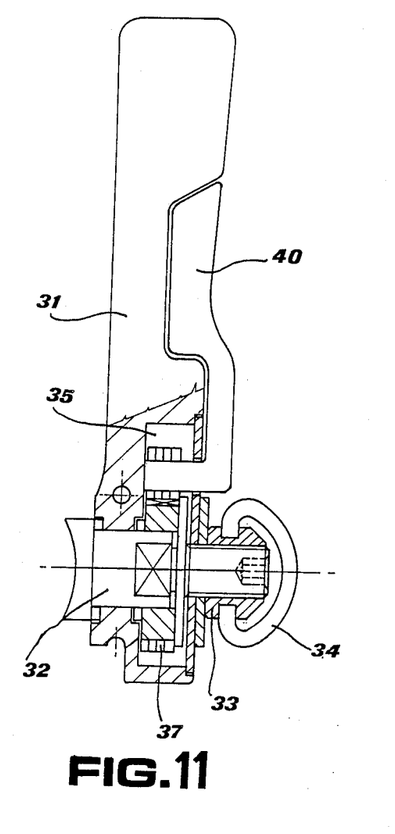
Figure 12:
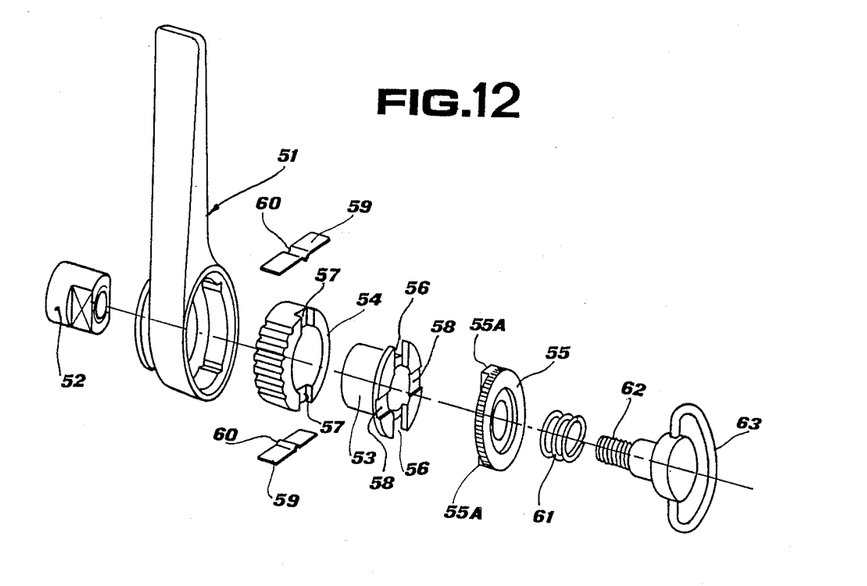
FIG. 12 is a perspective view of a third embodiment of the gear selector according to the invention with parts demounted.
Figure 13:
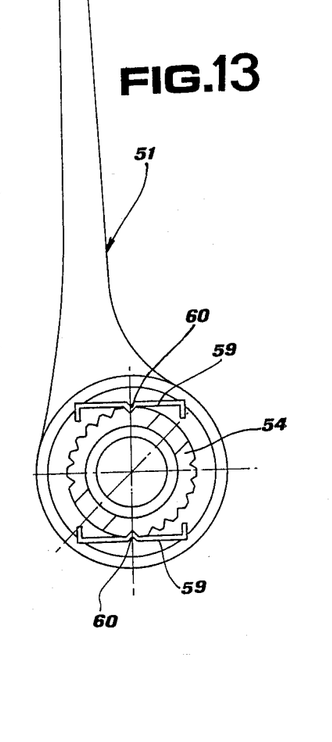
FIGS. 13 and 14 are a side selectional view and an axial section of the gear selector of FIG. 12.
Figure 14:
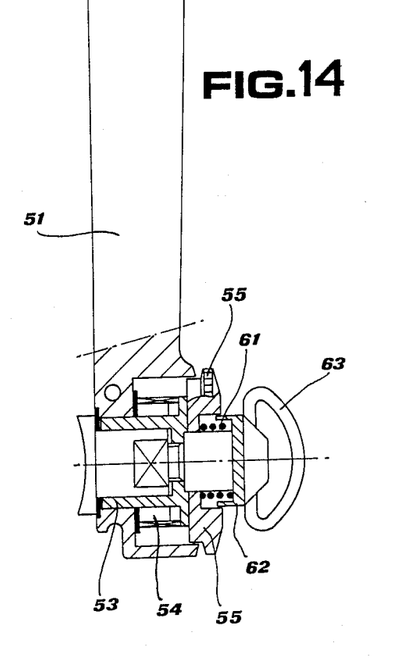
Figure 15:
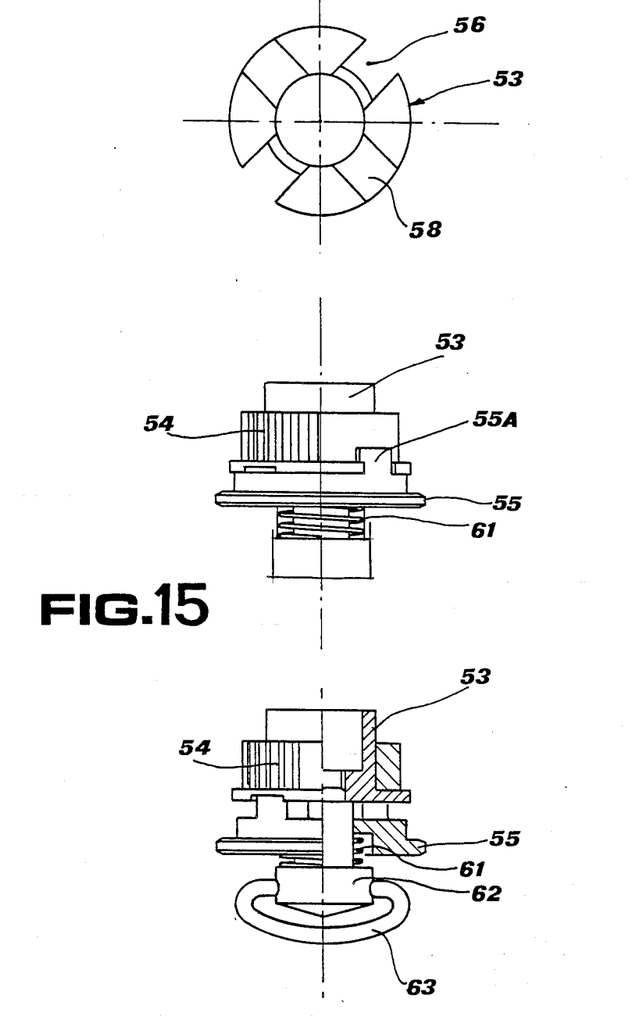
FIG. 15 shows by means of three drawings a detail of the snap-action control mechanism of the gear selector of FIGS. 12 to 14 in its activated and deactivated positions.

When the arm 40 is disposed aligned with the lever 31 of the gear selector and housed within the recess 43 provided therein for this purpose, the cam 42 does not interfere with the springs of the assembly 37, which therefore arrange themselves as shown in FIG. 8, with the pawl formed by the teeth 39 in strict elastic engagement with one of the notches of the ring 36. The snap-action mechanism controlling the position of the lever 31 of the gear selector is therefore active, and the movements of the lever 31 not only overcome the friction but also result in elastic deformation of the pack of springs 37 and the snapping of the pawl 39 into the required one or other of the notches of the ring 36, in accordance with the ratio required by the cyclist and easily and clearly determined by him.

If the snap-action mechanism is to be deactivated, it is necessary only to rotate the arm 40 forward through 90° so as to move it from the position shown in FIG. 8 to that shown in FIG. 9. In this manner, the cam 42 forces the springs of the assembly 37 upwards so deforming them elastically and withdrawing their teeth 39, which form the pawl of the device, from the notches of the ring 36 until there is no further engagement with them. The gear selector then operates conventionally by friction alone, and the ratio selection is then made by the cyclist by feel without any mechanical preselection.

This gear selector is also constructed of few components, which are of extreme constructional simplicity and ease of assembly, so that it is possible within a very short time to adapt it to any sprocket combination and free wheel by replacing the notched ring 36.

FIGS. 12 to 15 show a further embodiment of the gear selector having the characteristics of the invention.

It is composed of the lever 51 which rotates freely on the pivot 52, on which a bush 53 is fixed. A notched ring 54 is either free to rotate on the bush 53 or is made rigid with it, according to the position of a clutch ring 55, two diametrically opposing appendices 55A of which can either engage through seats 56 in the bush 53 and seats 57 in the notched ring 54, so making the bush 53 rigid with the ring 54 and locking this latter against rotation, or can rest on blind seats 58 in the bush 53, to leave the notched ring 54 free to rotate. The device is completed by two flat springs 59 mounted in the lever 51 above and below the ring 54, so that their central tooth 60 engages the noches of the ring 54 in the manner of a pawl. On rotating the lever 51, the teeth 60 engage the notches of the ring 54 in succession until they become positioned on that tooth corresponding to the required ratio, when operating with the snap-action control mechanism active.

In order to deactivate the snap-action control mechanism, it is necessary only to rotate the clutch ring through 90° (from the mechanism engagement position), so allowing the notched ring 54 to rotate. The friction resistance opposing the speed gear return spring is exerted by a spring 61, which is adjustable by the screw 62 controlled by the ring 63.

Figure 16:
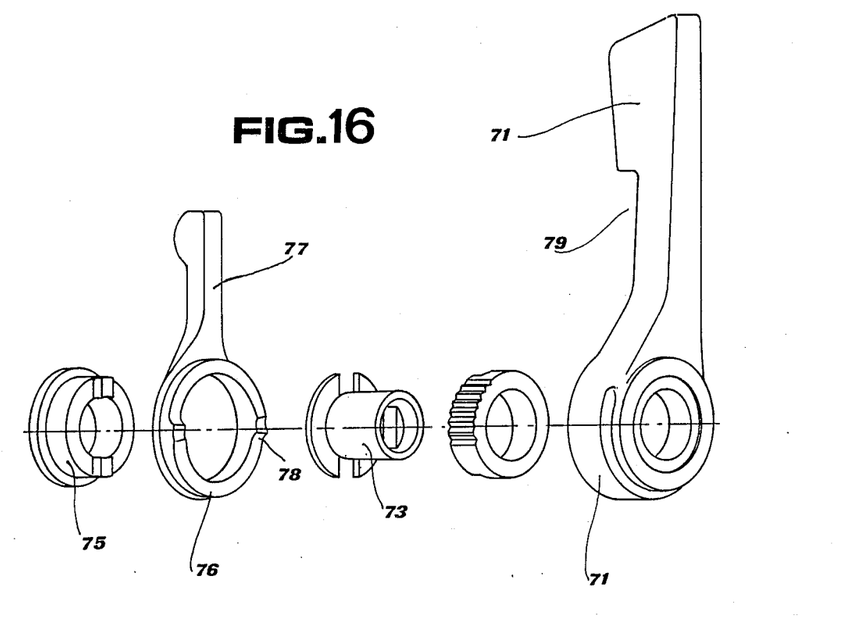
Figure 17:
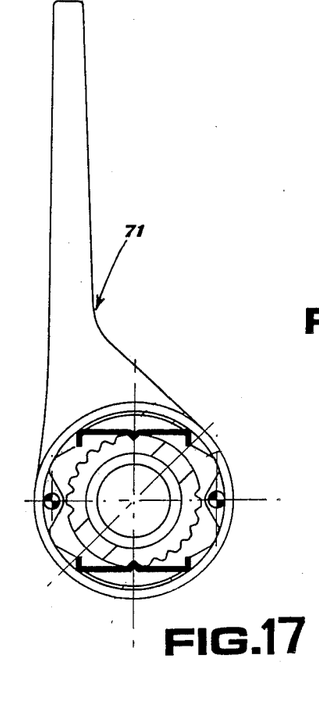
FIGS. 17 and 18 are a side view and axial section.
Figure 18:
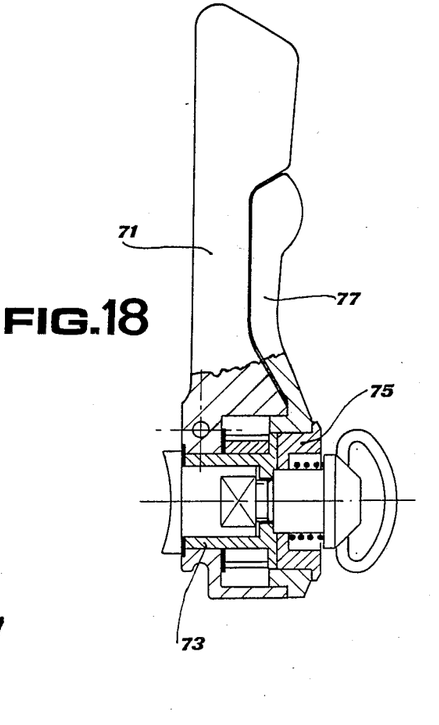

FIGS. 16 to 18 show a gear selector similar to the preceding gear selector of FIGS. 12 to 15, in which the engagement or disengagement of the mechanism is facilitated by the interposition between the clutch ring 75 and bush 73 of a ring 76 comprising a control arm 77 acting by means of a variable-profile flange 78. As in the case of the device of FIGS. 1 to 5, the arm 77 is housed in this case in a recess 79 provided for this purpose in the lever 71 of the gear selector.

Figure 19:
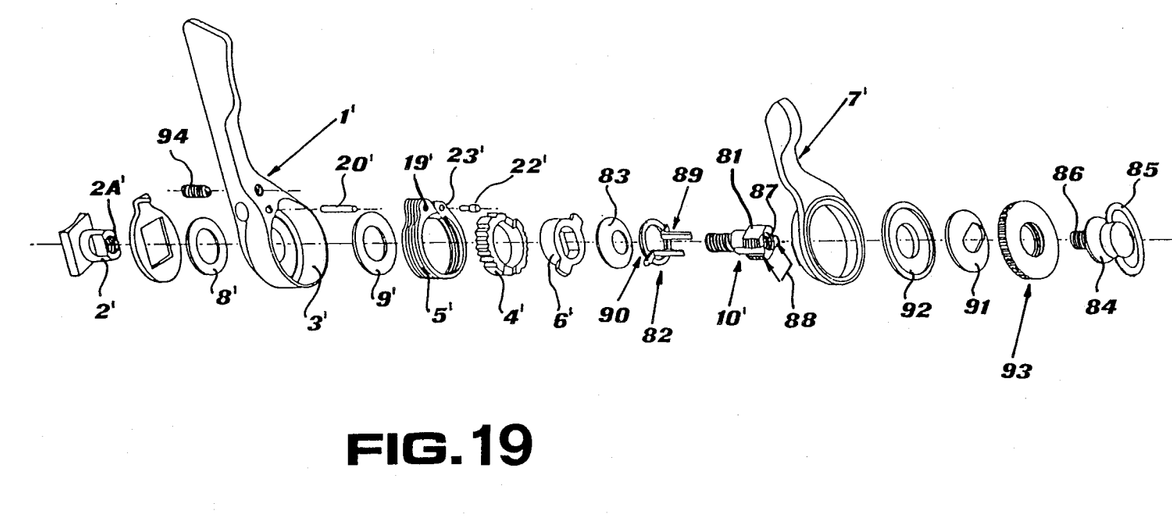
FIG. 19 is a perspective view with parts demounted of a further embodiment of the gear selector according to the invention, in which both the friction devices provided in it can be adjusted.
Figure 20:
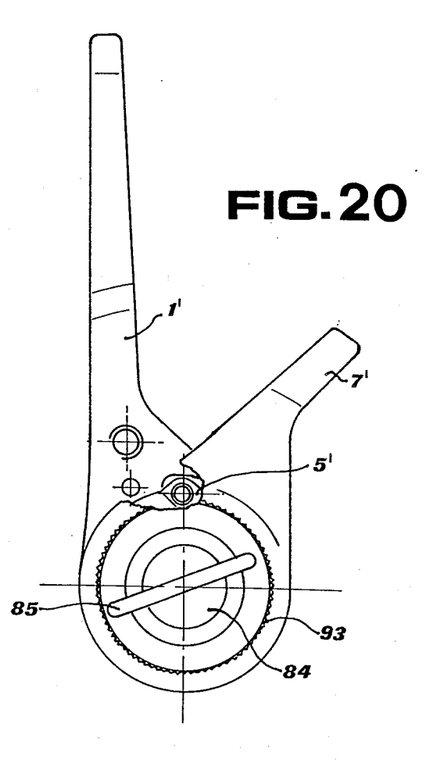
FIG. 20 is a partly sectional side view of the gear selector of FIG. 19.
Figure 21:
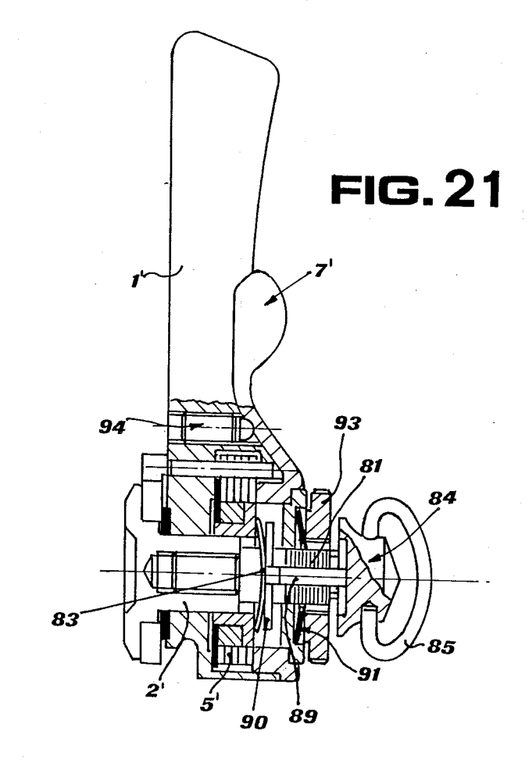
FIG. 21 is an axial section through the gear selector of FIGS. 19 and 20.

In the embodiment of the gear selector according to the invention shown in FIGS. 19 to 21, the friction system acting on the lever 1' (main gear selector friction device) comprises two washers 8' and 9', one mounted external to the lever 1' and the other mounted within the cavity 3' thereof, and a setscrew 10' the threaded shank of which is screwed into the threaded seat 2A' of the pivot 2' and the operating head of which is bevelled and partly threaded at 81, a presser 82, a cup spring 83 and a bush 84 with an operating ring 85 and its projecting stem 86 screwed into the threaded bore 87 of the head 81 of the screw 10'. In its head 81 and in a non-threaded part of its shank close to said head, this screw comprises two opposing longitudinal grooves 88 in which the two fork branches 89 emerging from the ring 90 of the presser 82 are housed and can slide. The ring 90 of the presser rests against the cup spring 83 which, by way of the stop cylinder 6' and notched ring 4', exerts on the washers 8' and 9', and therefore on the lever 1; a pressure the intensity of which depends on the axial position which the presser 82 is made to assume relative to the screw 10' by the operating bush 84, engaged with the ends of the branches 89, and depending on the extend to which its projecting stem 86 is screwed into said screw 10'. Thus whereas the screw 10' cannot be controlled by the cyclist as it is screwed into the seat 2A' during the mechanism assembly, the bush 84 can be easily and comfortably operated by the cyclist at any moment (even during a race) by its operating ring 85, so as to adjust the main friction device of the gear selector (and thus the force which during the operation of this latter opposes the speed gear return spring).

The drawings also show the second friction system of the gear selector (secondary gear selector friction device) consisting of a cup spring 91 fitted, in a manner which prevents it from rotating, on the bevelled head 81 of the screw 10' and acting by way of a pressing member 92 on the arm 7' so as to press it against the lever 1'. The cup spring 91 is pressed with greater or lesser strength against the pressing member 92 by a knurled-edge washer 93 which is screwed onto the head of the screw 10 whithout interfering with the fork branches 89 of the presser 82 and is mounted between said member 92 and the bush 84. In this manner, the secondary friction device of the gear selector can also be easily and comfortably controlled by the cyclist at any moment (even during a race).

In this embodiment of the gear selector according to the invention, the (adjustable) means for retaining the arm 7' associated with the main lever 1' comprise a grub screw 94 which can be screwed into the lever 1' and projects from it to engage a seat correspondingly provided (but not shown) in the arm 7'.

The possible embodiments of the device according to the invention are not listed to those described and illustrated.

Moreover, by means of any modifications which may be necessary and which will be apparent to experts of the art, the invention can be also applied to types of gear selector of different structure and characteristics from that described and illustrated.

All these different embodiments and modifications of the device according to the invention fall fully within the scope of the invention itself.

I claim:

1. A gear selector for controlling speed gears with a spring-loaded derailleur for sport and racing bicycles, said gear selector comprising an operating lever mounted rotatably on a pivot;
a snap-action mechanism controlling a plurality of positions of said lever which positions correspond to a like number of positions of correct alignment of the speed gear with which various sprockets of a free wheel correspond;
means for activating and deactivating said snap-action mechanism on command;
said snap-action mechanism comprising a removable toothed ring mounted coaxially to said gear selector lever on a bush locked against rotation;
pawl means for engaging said toothed ring in diametrically opposed positions, said pawl means comprising an integral portion of spring means which urges said pawl means into engagement with said toothed ring; and
said means for activating and deactivating said snap-action mechanism comprising a clutch ring by which said toothed ring can be made rigid with or free to rotate about said bush.

2. A gear selector as claimed in claim 1, wherein said ring being toothed on its outer periphery the teeth defining different positions, the number and distance apart of which are a function of the number of sprockets and type of the free wheel mounted on the bicycle.

3. The gear selector of claim 1 wherein said toothed ring includes diametrically opposed blind seats, said bush including a flange with diametrically opposed through seats corresponding to the seats of said toothed ring and diametrically opposed blind seats, said clutch ring being freely rotatable and including two diametrically opposed extensions adapted to engage said through seats of said flange of said bush and said seats of said toothed ring so as to render said bush and toothed ring mutually rigid, or to engage said diametrically opposed blind seats of the flange of said bush.

4. The gear selector of claim 1 wherein said spring means comprises two straight springs, said springs each including a tooth portion which forms said pawl means.

* * * * *